United States Patent
Browne et al.

(10) Patent No.: US 12,355,857 B2
(45) Date of Patent: Jul. 8, 2025

(54) TECHNOLOGIES FOR REASSEMBLING FRAGMENTED DATAGRAMS

(71) Applicant: Intel Corporation, Santa Clara, CA (US)

(72) Inventors: John J. Browne, Limerick (IE); Chris M. MacNamara, Ballyclough (IE); Declan W. Doherty, Dublin (IE); Konstantin Ananyev, Naas (IE)

(73) Assignee: Intel Corporation, Santa Clara, CA (US)

( * ) Notice: Subject to any disclaimer, the term of this patent is extended or adjusted under 35 U.S.C. 154(b) by 783 days.

(21) Appl. No.: 17/477,062

(22) Filed: Sep. 16, 2021

(65) Prior Publication Data
US 2022/0006884 A1 Jan. 6, 2022

(51) Int. Cl.
H04L 12/54 (2022.01)
H04L 47/43 (2022.01)
H04L 49/9057 (2022.01)
H04L 69/22 (2022.01)
H04L 69/324 (2022.01)

(52) U.S. Cl.
CPC ............ *H04L 69/22* (2013.01); *H04L 69/324* (2013.01)

(58) Field of Classification Search
None
See application file for complete search history.

(56) References Cited

U.S. PATENT DOCUMENTS

| | | | | |
|---|---|---|---|---|
| 7,038,574 B1 * | 5/2006 | Schlesener | ............ | H04L 45/00 709/240 |
| 8,971,345 B1 * | 3/2015 | McCanne | ........... | H04L 47/2441 370/412 |
| 2002/0131425 A1 * | 9/2002 | Shalom | ................ | H04L 69/168 370/389 |
| 2008/0056192 A1 * | 3/2008 | Strong | ................... | H04L 47/43 370/331 |
| 2009/0097495 A1 * | 4/2009 | Palacharla | ............ | H04L 49/901 370/413 |
| 2011/0134933 A1 * | 6/2011 | Eberle | .................... | H04L 49/102 370/412 |
| 2012/0182999 A1 * | 7/2012 | Pannell | ............... | H04L 47/2441 370/400 |
| 2012/0320924 A1 * | 12/2012 | Baliga | .................... | H04L 45/70 370/400 |
| 2014/0160935 A1 * | 6/2014 | Zecharia | ............. | H04L 47/2408 370/235 |
| 2017/0099161 A1 * | 4/2017 | Liu | ........................ | H04L 12/64 |

(Continued)

OTHER PUBLICATIONS

"Access Control Lists and IP Fragments," CISCO White Paper, Aug. 10, 2005, 9 pages.

(Continued)

*Primary Examiner* — Duc T Duong
(74) *Attorney, Agent, or Firm* — Alliance IP, LLC

(57) ABSTRACT

Techniques for reassembling fragmented datagrams are disclosed. Packets may be received and classified. Packets of a fragmented datagram may be stored for later reassembly. In the illustrative embodiment, a datagram is reassembled based on an identified class of service associated with the datagram. Additionally or alternatively, in the illustrative embodiment, a replay window of a replay attack detector may be tuned based on hardware performance of a compute device.

25 Claims, 9 Drawing Sheets

(56) References Cited

U.S. PATENT DOCUMENTS

| | | | |
|---|---|---|---|
| 2017/0171060 A1* | 6/2017 | Liu | H04L 67/60 |
| 2017/0366477 A1 | 12/2017 | Browne et al. | |
| 2018/0220283 A1* | 8/2018 | Condeixa | H04L 67/12 |
| 2020/0128113 A1* | 4/2020 | Ambati | H04L 45/74 |
| 2020/0169987 A1* | 5/2020 | Chen | H04W 72/56 |
| 2020/0403925 A1* | 12/2020 | Bevilacqua | H04L 69/16 |
| 2022/0086680 A1* | 3/2022 | Kwok | H04W 28/0268 |

OTHER PUBLICATIONS

"Multi-access edge computing," Wikipedia; as accessed Nov. 1, 2021 at https://en.wikipedia.org/wiki/Multi-access_edge_computing, 4 pages.

"The future mode of DDoS attack mitigation," NOKIA Bell Labs White Paper, Finland, 2018, 12 pages.

Basu, A., et al., "IPSec Anti-Replay Check Failures," CISCO White Paper, Jul. 27, 2016; 8 pages.

Chang, H., et al., "Cache-Friendly IP Reassembly Network Function," SOSR '20: Proceedings of the Symposium on SDN Research, Mar. 2020, pp. 69-75, 7 pages.

Data Plane Development Kit, "IP Fragmentation and Reassembly Library," as accessed Nov. 1, 2021 at https://doc.dpdk.org/guides/prog_guide/ip_fragment_reassembly_lib.html, 3 pages.

Data Plane Development Kit, "IP Reassembly Sample Application," as accessed Nov. 1, 2021 at https://doc.dpdk.org/guides/sample_app_ug/ip_reassembly.html, 5 pages.

Kent, S., et al., "IP Authentication Header;" The Internet Society, RFC 4302 IP Authentication Header, Dec. 2005, 34 pages.

Ziemba, G., et al., "Security Considerations for IP Fragment Filtering;" RFC 1858 Security Considerations—IP Fragment Filtering, Oct. 1995, 10 pages.

* cited by examiner

TECHNOLOGIES FOR REASSEMBLING FRAGMENTED DATAGRAMS

BACKGROUND

In the Internet Protocol (IP), datagrams can be fragmented into several packets as the datagram traverses different networks. The fragmentation of IP datagrams opens the door to fragmentation attacks, such as tiny fragment attacks, overlapping fragment attacks, and buffer overflow attacks.

DETAILED DESCRIPTION

Figure 1:
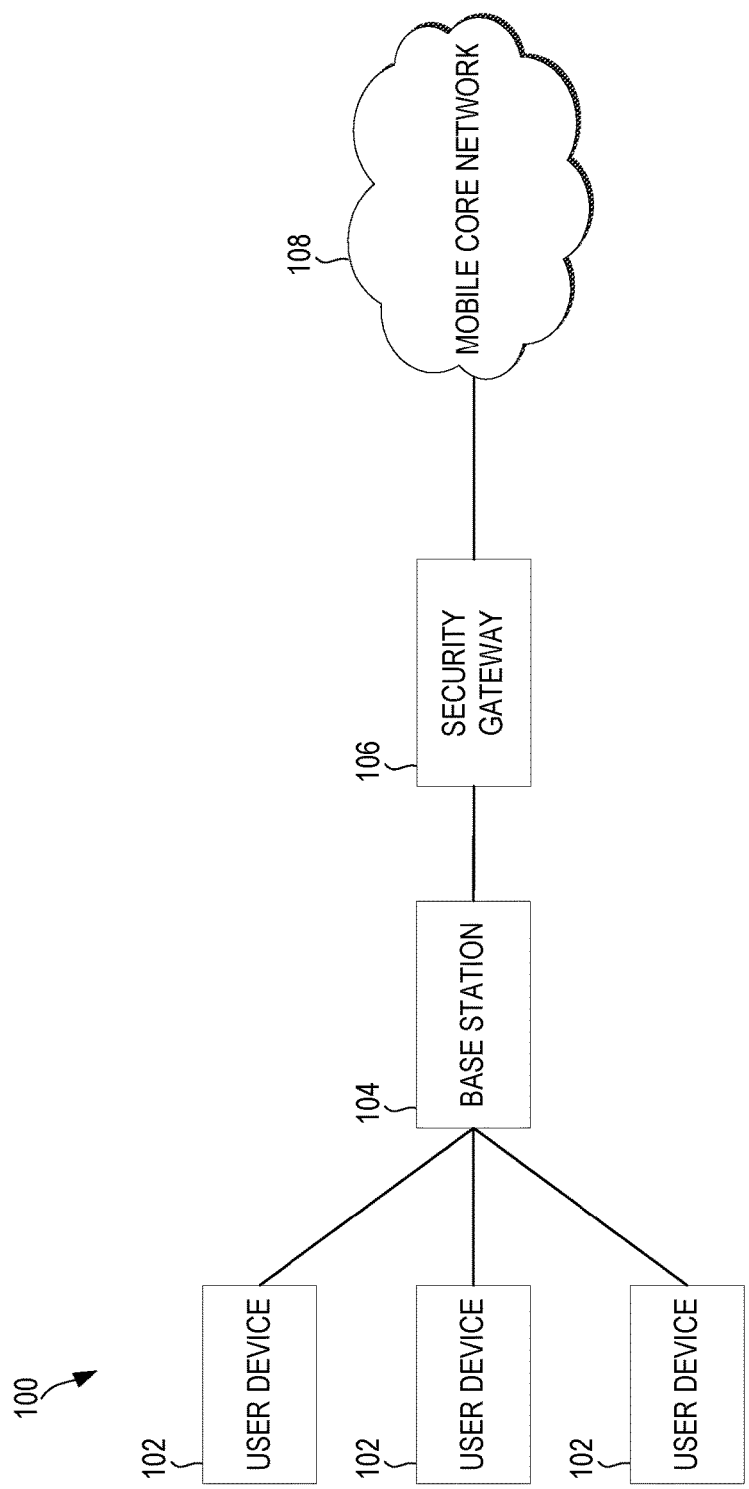
FIG. 1 is a simplified block diagram of at least one embodiment of a system with end user equipment communicating with a compute device.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, an illustrative system 100 includes one or more user devices 102 that connect to a base station 104 and a security gateway 106. The security gateway 106 is connected to a network, which may be a mobile core network 108 of a mobile service provider. In the illustrative embodiment, user devices 102 may send packets with fragments of IP datagrams to the base station 104. The packets are sent to the security gateway 106, which classifies the packets and determines if a packet is part of an IP fragmentation attack. Packets that are part of an attack are dropped. In the illustrative embodiment, the security gateway 106 reassembles the IP datagrams based on an identified class of service (CoS) of the IP datagrams, such as by reassembling IP datagrams with a high CoS before IP datagrams with a lower CoS. In some embodiments, the security gateway 106 checks a reassembled IP datagram for a possible replay attack. The window used to determine the presence of a replay attack may depend on performance of the security gateway 106, such as the latency of decrypting a datagram in hardware and/or the latency in reassembling a datagram.

In the illustrative embodiment, the user devices 102 may be any suitable device that can communicate with the base station 104, such as a cell phone, mobile device, laptop, etc. More generally, any suitable device may be sending packets to the security gateway 106, such as a server computer, a desktop computer, a laptop computer, a router, a switch, etc. The base station 104 may be any suitable base station, such as an eNodeB or a gNodeB.

The security gateway 106 may be any suitable device capable of performing the function described herein. In some embodiments, the security gateway 106 may be a stand-alone device. In other embodiments, the security gateway 106 may form a part of or include some or all of the base station 104 and/or the mobile core network 108. In some embodiments, the security gateway 106 may be embodied as a compute device 106 described below in regard to FIG. 2.

In the illustrative embodiment, the security gateway 106 protects a mobile core network 108 from certain attacks such as an IP fragmentation-based distributed denial of service (DDoS) attack. However, it should be appreciated that the technology disclosed herein may be used in any suitable environment, such as a mobile network, a data center, an edge network, a cloud data center, an edge data center, a micro data center, a multi-access edge computing (MEC) environment, etc.

As used herein, a datagram refers to a complete protocol message that may be fragmented into multiple packets. A datagram may be, for example, an IPv4 datagram. As used herein, a packet refers to a formatted unit of data that is sent or received at a network interface controller or other network device. A packet may be, for example, an IPv4 packet. A packet may include a fragment of a datagram or may include an entire datagram.

Figure 2:
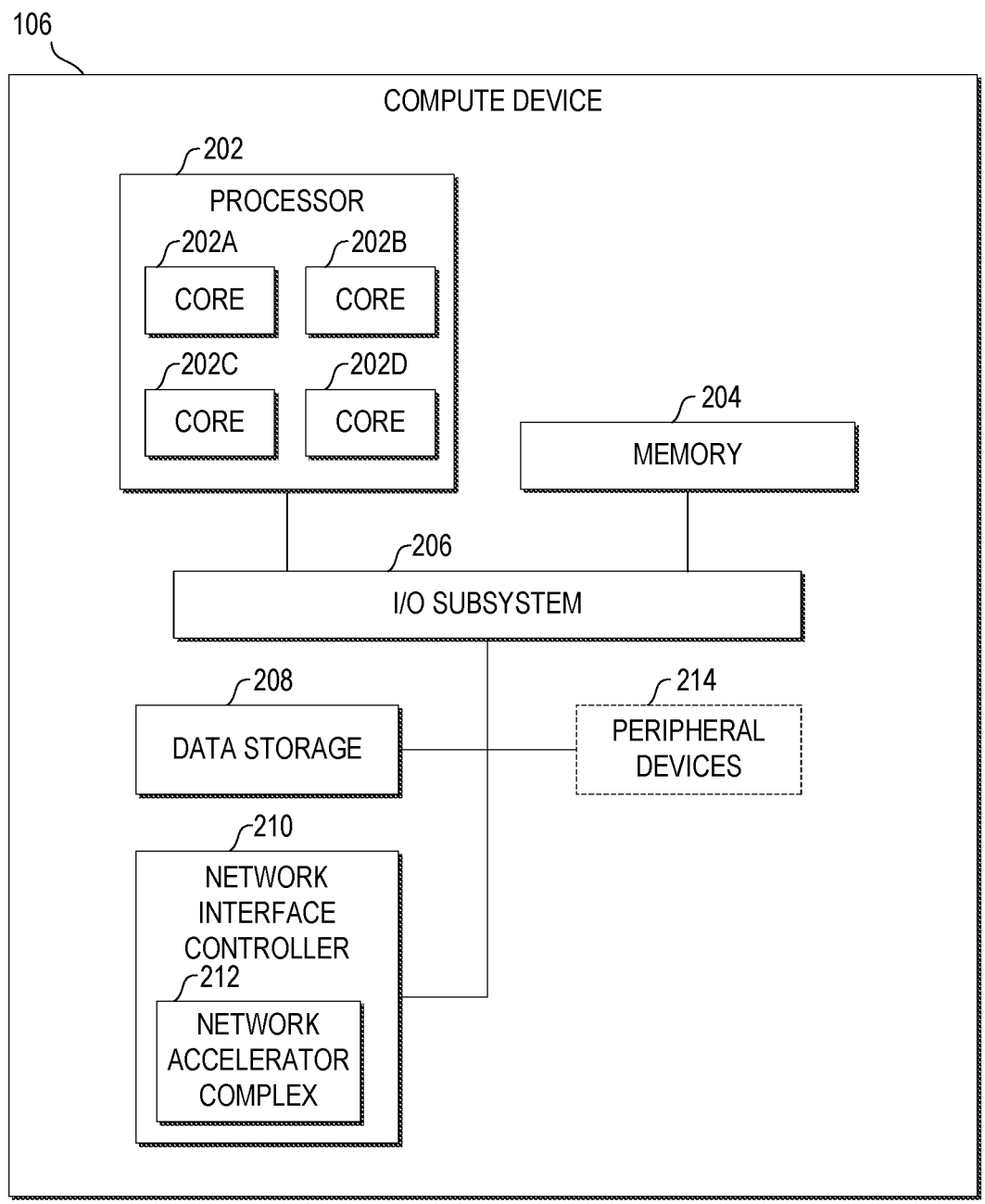
FIG. 2 is a simplified block diagram of at least one embodiment of a compute device that may act as a security gateway of the system of FIG. 1.

Referring now to FIG. 2, a simplified block diagram of a compute device 106 is shown. The compute device 106 may be embodied as, e.g., the security gateway 106. The compute device 106 may be embodied as any type of compute device. For example, the compute device 106 may be embodied as or otherwise be included in, without limitation, a server computer, an embedded computing system, a System-on-a-Chip (SoC), a multiprocessor system, a processor-based system, a consumer electronic device, a smartphone, a cellular phone, a desktop computer, a tablet computer, a notebook computer, a laptop computer, a network device, a router, a switch, a networked computer, a wearable computer, a handset, a messaging device, a camera device, a distributed computing system, and/or any other computing device. The illustrative compute device 106 includes a processor 202, a memory 204, an input/output (I/O) subsystem 206, data storage 208, a network interface controller (NIC) 210, and one or more optional peripheral devices 214. In some embodiments, one or more of the illustrative components of the compute device 106 may be incorporated in, or otherwise form a portion of, another component. For example, the memory 204, or portions thereof, may be incorporated in the processor 202 in some embodiments.

In some embodiments, the compute device 106 may be located in a data center with other compute devices 106, such as an enterprise data center (e.g., a data center owned and operated by a company and typically located on company premises), managed services data center (e.g., a data center managed by a third party on behalf of a company), a colocated data center (e.g., a data center in which data center infrastructure is provided by the data center host and a company provides and manages their own data center components (servers, etc.)), cloud data center (e.g., a data center operated by a cloud services provider that host companies applications and data), and an edge data center (e.g., a data center, typically having a smaller footprint than other data center types, located close to the geographic area that it serves), a micro data center, etc.

The processor 202 may be embodied as any type of processor capable of performing the functions described herein. For example, the processor 202 may be embodied as a single or multi-core processor(s), a single or multi-socket processor, a digital signal processor, a graphics processor, a neural network compute engine, an image processor, a microcontroller, an infrastructure processing unit (IPU), a data processing unit (DPU), an xPU, or other processor or processing/controlling circuit. The illustrative processor 202 includes multiple processor cores 216, such as processor core 216A, processor core 216B, processor core 216C, and processor core 216D, as shown in FIG. 1. In the illustrative embodiment, the various processor cores 216 of the processor 202 may be assigned different priority levels. In the illustrative embodiment, the priority levels may be embodied as certain pre-defined profiles of the cores 216. In other embodiments, the priority levels may be embodied as a specified frequency or voltage that should be provided by the core 216 under certain conditions. The priority levels of the cores 216 may be controlled by a hardware setting, a firmware setting, or a software setting, such as a setting of an orchestrator. In some embodiments, the processor 202 may be compatible with or include an implementation of Intel® Select Support Technology (SST), such as Intel® SST Core Power (SST-CP), Intel® SST Base Frequency (SST-BF), and/or Intel® SST Turbo Frequency (SST-TF). The processor 202 may include any suitable number of cores 216, such as any number from 2-1,024.

The memory 204 may be embodied as any type of volatile or non-volatile memory or data storage capable of performing the functions described herein. In operation, the memory 204 may store various data and software used during operation of the compute device 106, such as operating systems, applications, programs, libraries, and drivers. The memory 204 is communicatively coupled to the processor 202 via the I/O subsystem 206, which may be embodied as circuitry and/or components to facilitate input/output operations with the processor 202, the memory 204, and other components of the compute device 106. For example, the I/O subsystem 206 may be embodied as, or otherwise include, memory controller hubs, input/output control hubs, firmware devices, communication links (e.g., point-to-point links, bus links, wires, cables, light guides, printed circuit board traces, etc.) and/or other components and subsystems to facilitate the input/output operations. The I/O subsystem 206 may connect various internal and external components of the compute device 106 to each other with use of any suitable connector, interconnect, bus, protocol, etc., such as an SoC fabric, PCIe®, USB2, USB3, USB4, NVMe®, Thunderbolt®, and/or the like. In some embodiments, the I/O subsystem 206 may form a portion of a system-on-a-chip (SoC) and be incorporated, along with the processor 202, the memory 204, the NIC 210, and other components of the compute device 106 on a single integrated circuit chip.

The data storage 208 may be embodied as any type of device or devices configured for the short-term or long-term storage of data. For example, the data storage 208 may include any one or more memory devices and circuits, memory cards, hard disk drives, solid-state drives, or other data storage devices.

The NIC 210 may be embodied as any type of interface capable of interfacing the compute device 106 with other compute devices, such as over one or more wired or wireless connections. In some embodiments, the NIC 210 may be capable of interfacing with any appropriate cable type, such as an electrical cable or an optical cable. The NIC 210 may be configured to use any one or more communication technology and associated protocols (e.g., Ethernet, Bluetooth®, Wi-Fi®, WiMAX, near field communication (NFC), 4G, 5G, etc.). The NIC 210 may be located on silicon separate from the processor 202, or the NIC 210 may be included in a multi-chip package with the processor 202, or even on the same die as the processor 202. The NIC 210 may be embodied as one or more add-in-boards, daughtercards, network interface cards, controller chips, chipsets, specialized components such as a field-programmable gate array (FPGA) or application-specific integrated circuit (ASIC), or other devices that may be used by the compute device 202 to connect with another compute device. In some embodiments, NIC 210 may be embodied as part of a system-on-a-chip (SoC) that includes one or more processors, or included on a multichip package that also contains one or more processors. In some embodiments, the NIC 210 may include a network accelerator complex (NAC) 212, which may include a local processor, local memory, and/or other circuitry on the NIC 210. In such embodiments, the NAC 212 may be capable of performing one or more of the functions of the processor 202 described herein. Additionally or alternatively, in such embodiments, the NAC 212 of the NIC 210 may be integrated into one or more components of the compute device 106 at the board level, socket level, chip level, and/or other levels.

In some embodiments, the compute device 106 may include other or additional components, such as those commonly found in a compute device. For example, the compute device 106 may also have peripheral devices 214, such as a keyboard, a mouse, a speaker, a microphone, a display, a camera, a battery, an external storage device, etc.

Figure 3:
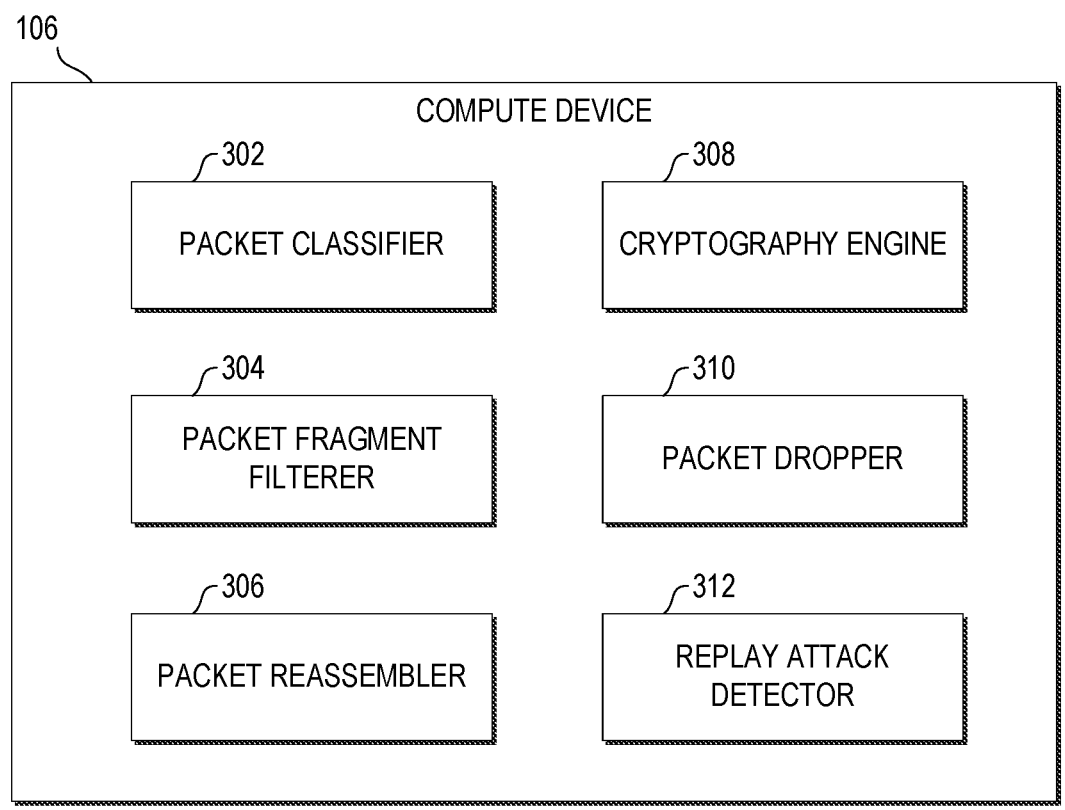
FIG. 3 is a simplified block diagram of at least one embodiment of an environment that may be established by the compute device of FIG. 2.

Referring now to FIG. 3, in an illustrative embodiment, the compute device 106 establishes an environment 300 during operation. The illustrative environment 300 includes a packet classifier 302, a packet fragment filterer 304, a packet reassembler 306, a cryptography engine 308, a packet dropper 310, and a replay attack detector 312. The various modules of the environment 300 may be embodied as hardware, software, firmware, or a combination thereof. For example, the various modules, logic, and other components of the environment 300 may form a portion of, or otherwise be established by, the processor 202 or other hardware components of the compute device 106 such as the memory 204, the data storage 208, the NIC 210, etc. As such, in some embodiments, one or more of the modules of the environment 300 may be embodied as circuitry or collection of electrical devices (e.g., packet classifier circuitry 302, packet fragment filterer circuitry 304, packet reassembler circuitry 306, etc.). It should be appreciated that, in such embodiments, one or more of the circuits (e.g., the packet classifier circuitry 302, the packet fragment filterer circuitry 304, the packet reassembler circuitry 306, etc.) may form a portion of one or more of the processor 202, the NIC 210, the memory 204, the I/O subsystem 206, the data storage 208, and/or other components of the compute device 106. For example, in some embodiments, some of the modules may be partially or completely by the NIC 210, and some of the modules may be partially or completely performed by the processor 202. In some embodiments, some or all of the modules may be embodied as the processor 202 and/or NAC 212 as well as the memory and/or data storage storing instructions to be executed by the processor 202 and/or NAC 212. Additionally, in some embodiments, one or more of the illustrative modules may form a portion of another module and/or one or more of the illustrative modules may be independent of one another. Further, in some embodiments, one or more of the modules of the environment 200 may be embodied as virtualized hardware components or emulated architecture, which may be established and maintained by the processor 202 or other components of the compute device 106. It should be appreciated that some of the functionality of one or more of the modules of the environment 200 may require a hardware implementation, in which case embodiments of modules that implement such functionality will be embodied at least partially as hardware.

The packet classifier 302, which may be embodied as hardware, firmware, software, virtualized hardware, emulated architecture, and/or a combination thereof, as discussed above, is configured to classify packets received at the NIC 210, such as by classifying packets into different flows. The packet classifier 302 may determine a class of service for each packet received. The packet classifier 302 may determine a class of service based on any suitable combination of, e.g., a source IP address, a source port number, a destination IP address, a destination port number, and a protocol in use. The packet classifier 302 may determine whether the packet is a fragment of a datagram. In the illustrative embodiment, the packet classifier 302 stores received packets in a reorderless ring and processes the packets while they are in the reorderless ring. More information regarding a reorderless ring may be found in patent application publication no. US2017/0366477, entitled "Technologies for coordinating access to data packets in a memory," by John J. Browne et al. In some embodiments, the compute device 106 may use a different reorderless ring for each port. In the illustrative embodiment, the packet classifier 302 is on the NIC 210.

In the illustrative embodiment, the packet is an IPv4 packet, and a three-bit flag field in the packet is used to control or identify fragments. The first bit is reserved and set to zero. The second bit indicates whether fragmentation is allowed for the packet. If fragmentation is not allowed, the bit is set. Otherwise, the bit is cleared. The third bit indicates whether there are more fragments after the current fragment. If the third bit is set, then there are more fragments in the datagram. If the third bit is cleared, then there are not more fragments in the datagram. Additionally, the packet may include a fragment offset field that specifies an offset for the fragment included in the packet in units of eight-byte blocks. If the fragment offset field is not zero or if the bit indicating that there are more fragments are set, then the packet is part of a fragmented datagram. Otherwise, the packet is not part of a fragmented datagram. The packet may also include an identification field. Different packets of the same datagram may use the same identification field, allowing the various packets of a datagram to be identified for reassembly. In the illustrative embodiment, the packet classifier 302 may also perform some filtering on the packets, such as a whitelist filter, a denial of service (DoS) filter, etc.

The packet fragment filterer 304, which may be embodied as hardware, firmware, software, virtualized hardware, emulated architecture, and/or a combination thereof, as discussed above, is configured to apply filters to packets to check for fragmentation attacks. The packet fragment filterer 304 may determine whether a packet is part of a tiny fragment attack. In a tiny fragment attack, an attacker sends a fragment that is small enough to force certain header fields (such as TCP or UDP layer four header fields) to a subsequent packet, preventing filtering on those header fields on the first fragment. In some embodiments, the packet fragment filterer 304 may drop the packet if the fragmentation offset is zero, the protocol is TCP, and the length of the transport header is less than a minimum threshold. In some embodiments, the threshold may be, e.g., 16 or 24 bytes. Additionally or alternatively, in some embodiments, the packet fragment filterer 304 may drop the packet if the fragment offset field is equal to one.

Additionally or alternatively, the packet fragment filterer 304 may determine whether a packet is part of an overlapping fragment attack. In an overlapping fragment attack, an attacker sends fragments that overlap. For example, the first fragment might have a payload length of 32 bytes, which should result in the second fragment having a value in the fragmentation offset field of 4 (that is, an offset of 4 octets or 32 bytes). If the second fragment has a value in the fragmentation offset field less than 4, then the compute device 106 may generate an error when trying to reassemble the datagram, or a header field might get overwritten, preventing the packet from being filtered properly. The packet fragment filterer 304 may detect when two fragments overlap and drop the fragments. In some embodiments, the packet fragment filterer 304 may drop any TCP packets with a fragment offset field value of 1, which prevents the TCP header of the first fragment from being overwritten by a subsequent fragment.

In the illustrative embodiment, the packet fragment filterer 304 processes packets while they are in a reorderless ring on the NIC 210. In the illustrative embodiment, after applying filters to filter out possible fragmentation attacks, the packet fragment filterer 304 sends packets to reorderless rings on a core of the processor 202. In other embodiments, packets may stay on the NIC 210 or may have fragment filtering performed on a core of the processor 202.

The packet reassembler 306, which may be embodied as hardware, firmware, software, virtualized hardware, emulated architecture, and/or a combination thereof, as discussed above, is configured to access a packet to be reassembled with other packets to form a datagram. In the illustrative embodiment, the packet reassembler 306 accesses a packet on a reorderless ring. The packet reassembler 306 retrieves the packet to be reassembled based on a class of service of the packet or datagram. For example, there may be several packets or datagrams waiting for reassembly, and the packet reassembler 306 may select a packet with the higher class of service (or higher class of service than non-selected packets).

The packet reassembler 306 checks a library for other fragments of the datagram of the accessed packet. If the compute device 106 finds the last fragment (that is, the fragment with the flag for more fragments cleared) and every other fragment from the first to the last fragment without any gaps, then all fragments of the datagram have been received. If all fragments of the datagram have been received, the packet reassembler 306 reassembles the datagram.

If the fragment is the first fragment in time received for a datagram, a timer may be started. If all of the fragments of the datagram have not been received by a particular time from when the first fragment is received, then all fragments of the datagram may be dropped.

The cryptography engine 308, which may be embodied as hardware, firmware, software, virtualized hardware, emulated architecture, and/or a combination thereof, as discussed above, is configured to is configured to perform encryption and decryption operations on packets. In some embodiments, the cryptography engine 308 may be embodied as hardware or software on the NIC 210. In other embodiments, some or all of the cryptography engine 308 may be embodied as hardware or software on the processor 202. In some embodiments, the cryptography engine 308 may decrypt packets that include a whole datagram in-line as the packet is received. In other embodiments, the compute device 106 may send a datagram reassembled from several packets from the processor 202 to the NIC 210 to be decrypted by the cryptography engine 308 on the NIC 210.

The packet dropper 310, which may be embodied as hardware, firmware, software, virtualized hardware, emulated architecture, and/or a combination thereof, as discussed above, is configured to is configured to drop packets. In some cases, packets may be dropped because a packet is determined to be malicious or potentially malicious. For example, a packet may be dropped if a packet does not pass a standard filter, a packet does not pass a fragmentation filter, a packet does not pass a replay attack detector, a packet fragment expires before all fragments of the corresponding datagram are received, etc. In some embodiments, when a packet is dropped, all other packets of the same datagram are also dropped. The packet dropper 310 logs that the packet was dropped, certain metadata about the packet such as header data, and the reason why the packet was dropped. The reason may be, e.g., that the packet did not pass a filter, that a packet was detected as an IP fragmentation attack, that the packet was detected as a replay attack, etc.

The packet dropper 310 may check for error conditions in the processing of packets. The packet dropper 310 may determine whether the number of datagrams being reassembled is over a threshold value. The threshold value may be any suitable value, such as $2^{10}$-$2^{32}$. If the number of datagrams being reassembled is over a threshold, the packet dropper 310 drops some or all of the packets of datagrams to be reassembled. In some embodiments, the packet dropper 310 may select which packets to drop based on a class of service associated with the packets. Packets with a higher class of service may be kept, and packets with a lower class of service may be dropped. A log entry may be made noting that the packets were dropped.

Additionally or alternatively, the packet dropper 310 may determine whether the number of fragments for individual datagrams being reassembled is over a threshold. The threshold may be any suitable value, such as 4-1,024. If the number of fragments is over the threshold for any datagram, the packet dropper 310 drops packets for datagrams that have too many fragments.

The replay attack detector 312, which may be embodied as hardware, firmware, software, virtualized hardware, emulated architecture, and/or a combination thereof, as discussed above, is configured to check datagrams for replay attacks. To do so, in the illustrative embodiment, the replay attack detector 312 determines whether the received datagram (which may be from several reassembled packets or from one packet with a whole datagram) was received within the anti-replay window of the datagram with the highest sequence number for the security association of the datagram. The replay window may be any suitable value, such as 32-32,768. If the replay attack detector 312 detects a replay attack, the packet is dropped.

In the illustrative embodiment, replay attack detector 312 may determine a replay window based on a hardware parameter of the compute device 102. The replay attack detector 312 may determine a latency for in-line decryption in the NIC 210 or other hardware or software decryption engine. Additionally or alternatively, the replay attack detector 312 determines a latency for fragment reassembly, that is, an expected latency for the time between receiving the first fragment of a datagram and when reassembly of the datagram is expected to be completed. In some embodiments, non-fragmented packets may be decrypted in-line, prior to a replay attack check, while fragmented packs may be reassembled and then checked for a replay attack, without decryption. As such, it should be appreciated that non-fragmented packets have a latency between receipt and the replay attack check than the latency for fragmented packets. The replay attack detector 312 may determine a replay window based on these expected latencies to reduce or eliminate the chance of a datagram being rejected due to hardware latency before the replay attack check. The replay window may depend on the latency times, a processing speed, a network speed, an expected number of packets per second, etc. After determining a suitable replay window, the replay attack detector 312 sets the replay window based on the hardware performance. For example, the replay attack detector 312 may set a parameter of one or more IPSec protocols.

Figure 4:
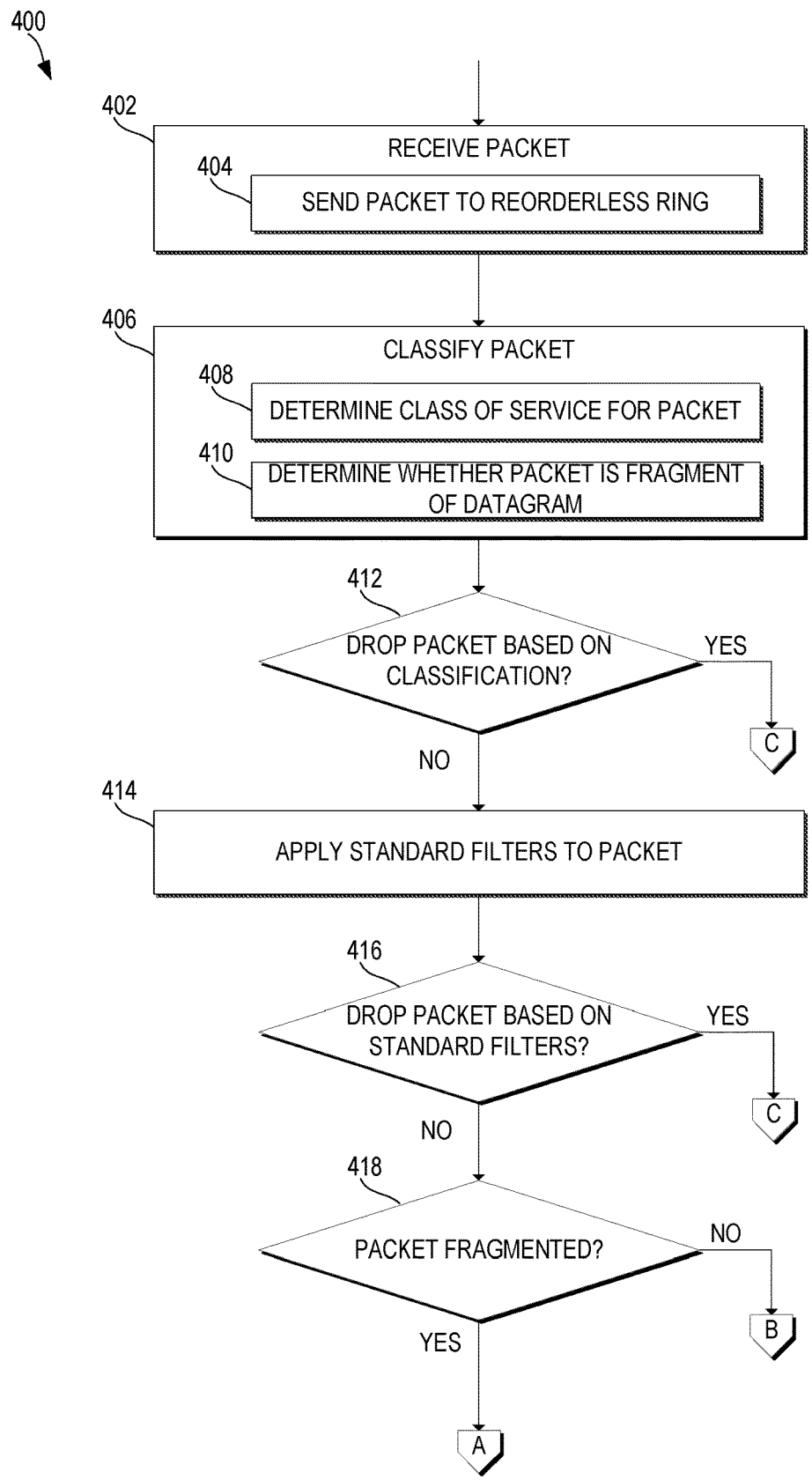
FIGS. 4-7 are a simplified flow diagram of at least one embodiment of a method for processing packets that may be fragments of datagrams that may be executed by the compute device of FIG. 1.

Referring now to FIG. 4, in use, the compute device 106 may execute a method 400 for processing packets that may be fragments of datagrams. The method 400 may be executed by any suitable component or combination of components of the compute device 106, including hardware, software, firmware, etc. For example, some or all of the method 400 may be performed by the NIC 210 and/or the processor 202. The method 400 begins in block 402, in which the compute device 106 receives a packet, such as a packet from a user device 102 or other remote device. In the illustrative embodiment, the compute device 106 sends the packet to a reorderless ring in block 404.

In block 406, the compute device 106 classifies the packet. The compute device 106 may determine a class of service for the packet in block 408. The compute device 106 may determine a class of service based on any suitable combination of, e.g., a source IP address, a source port number, a destination IP address, a destination port number, and a protocol in use. The compute device 106 determines whether the packet is a fragment of a datagram in block 410. The compute device 106 may use the three-bit flag field discussed above to identify fragments. Additionally, the packet may include a fragment offset field that specifies an offset for the fragment included in the packet in units of eight-byte blocks. If the fragment offset field is not zero or if the bit indicating that there are more fragments are set, then the packet is part of a fragmented datagram. Otherwise, the packet is not part of a fragmented datagram. The packet may also include an identification field. Different packets of the same datagram may use the same identification field, allowing the various packets of a datagram to be identified for reassembly.

Figure 7:
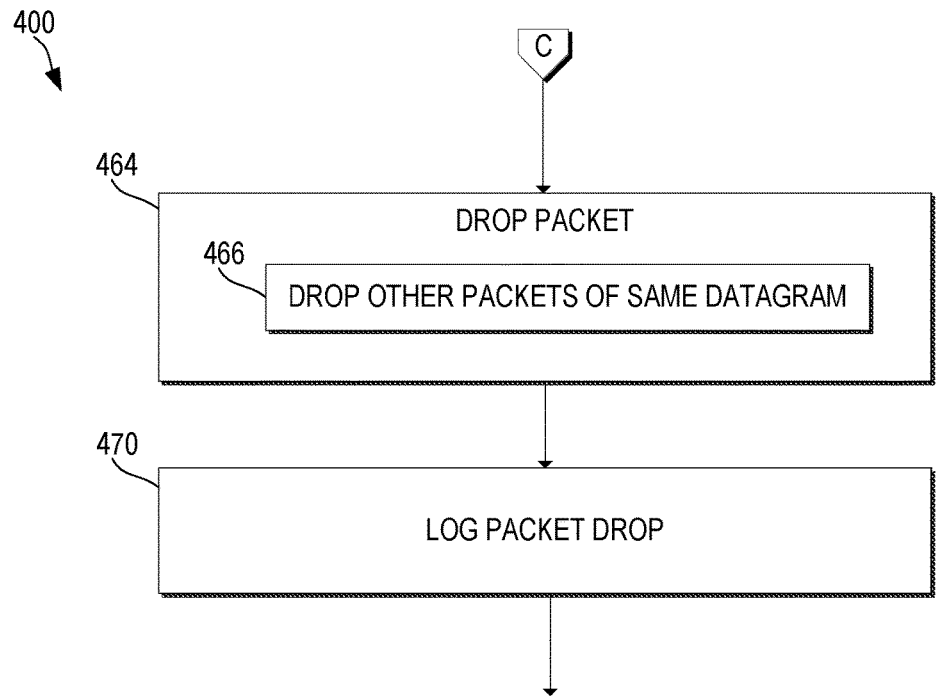

In block 412, if the compute device 106 is to drop the packet based on the classification, the method 400 jumps to block 464 in FIG. 7 to drop the packet. If the compute device 106 is not to drop the packet based on the classification, the method 400 proceeds to block 414.

In block 414, the compute device 106 applies standard filters to the packet, such as a whitelist filter, a denial of service (DoS) filter, etc. In block 416, if the compute device 106 is to drop the packet based on the standard filters, the method 400 jumps to block 464 in FIG. 7 to drop the packet. If the compute device 106 is not to drop the packet based on the classification, the method 400 proceeds to block 418.

Figure 5:
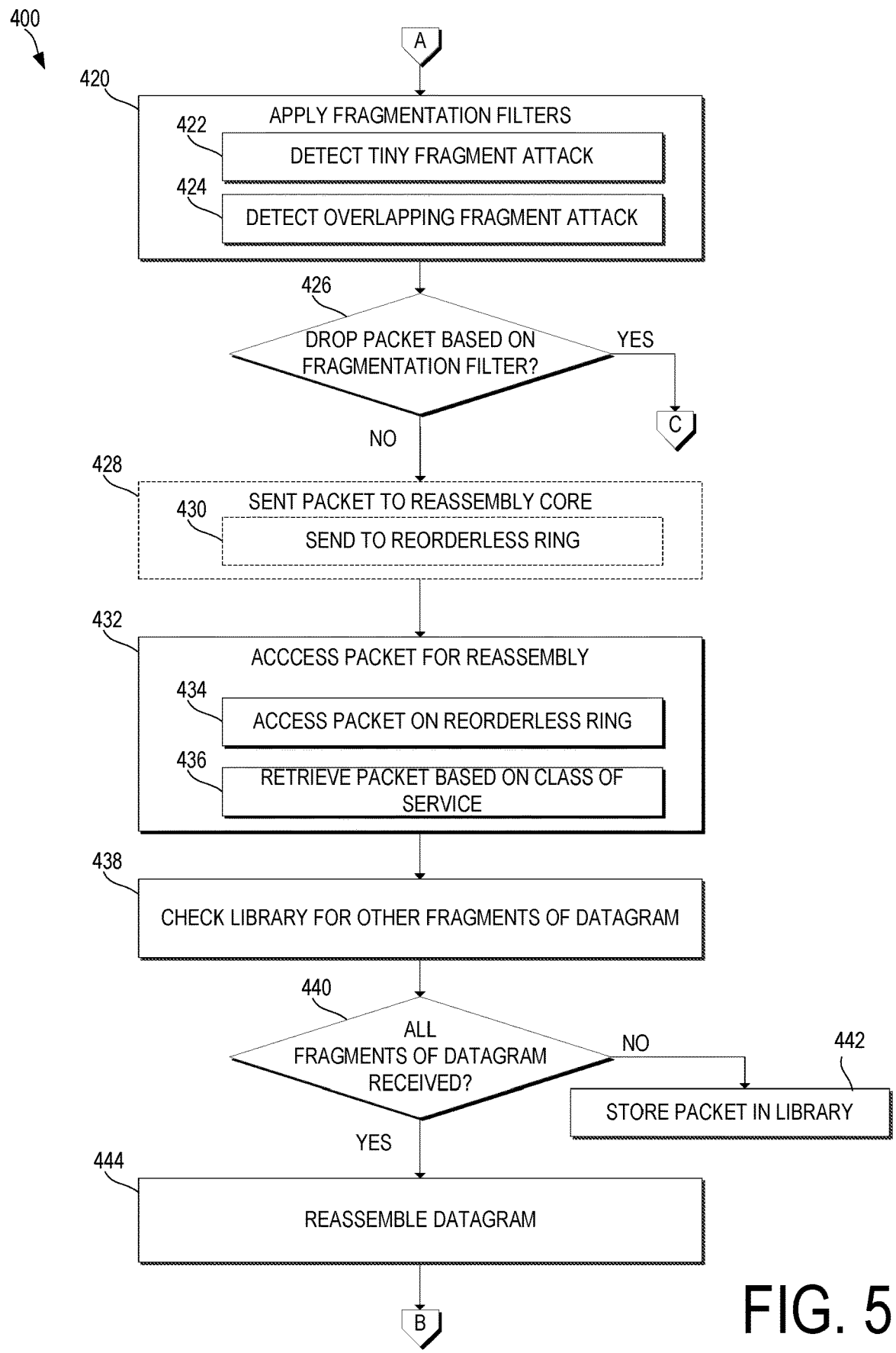
Figure 6:
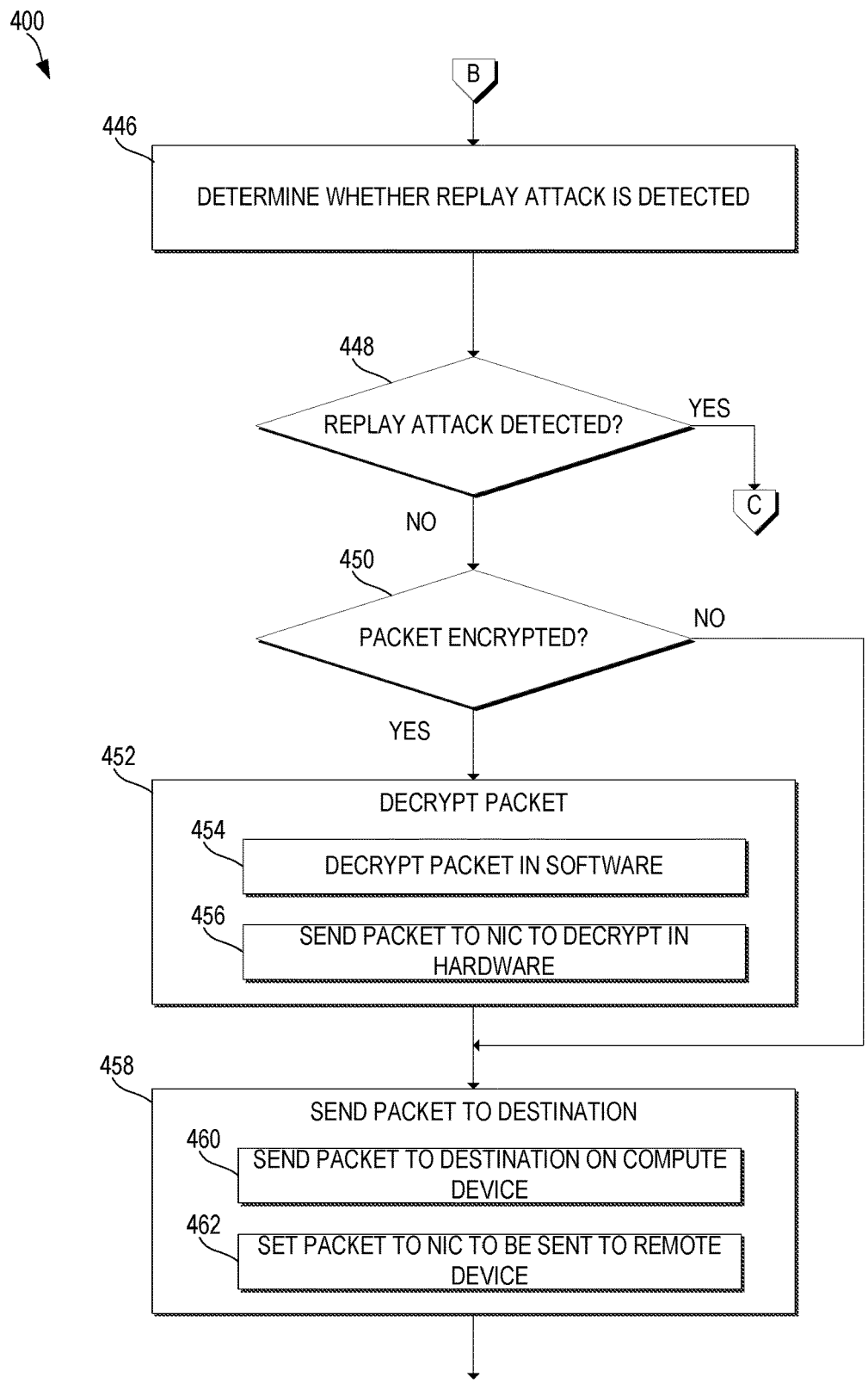

In block 418, if the packet is not fragmented, the method 400 jumps to block 448 in FIG. 6 to determine whether a replay attack is detected. If the packet is fragmented, the method 400 continues to block 420 in FIG. 5.

Referring now to FIG. 5, in block 420, the compute device 106 applies one or more fragmentation filters to determine if the packet is part of an IP fragmentation attack. In block 422, the compute device 106 determines whether the packet is part of a tiny fragment attack. In some embodiments, the compute device 106 may drop the packet if the fragmentation offset is zero, the protocol is TCP, and the length of the transport header is less than a minimum threshold. In some embodiments, the threshold may be, e.g., 16 or 24 bytes. Additionally or alternatively, in some embodiments, the compute device 106 may drop the packet if the fragment offset field is equal to one.

In block 424, the compute device 106 determines whether the packet is part of an overlapping fragment attack. The compute device 106 may detect when two fragments overlap and drop the fragments. In some embodiments, the compute device 106 may drop any TCP packets with a fragment offset field value of 1, which prevents the TCP header of the first fragment from being overwritten by a subsequent fragment.

In block 426, if the compute device 106 is to drop the packet based on the fragmentation filters, the method 400 jumps to block 464 in FIG. 7 to drop the packet. If the compute device 106 is not to drop the packet based on the fragmentation filters, the method 400 proceeds to block 428.

In the illustrative embodiment, in block 428, the compute device 106 sends the packet from the NIC 210 to a core of the processor 202. To do so, in block 430, the compute device 106 sends the packet to a reorderless ring. The compute device 106 may establish a reorderless ring for each port and for each class of service. In other embodiments, the packet may remain on the NIC 210 (or may have already been on the processor 202).

In block 432, in the illustrative embodiment, a core of the processor 202 of the compute device 106 accesses a packet to be reassembled with other packets to form a datagram. In block 434, the compute device 106 accesses a packet on a reorderless ring. In block 436, the compute device 106 accesses the packet to be reassembled based on a class of service of the packet or datagram. For example, there may be several packets or datagrams waiting for reassembly, and the compute device 106 may select a packet with the higher class of service (or higher class of service than non-selected packets).

In block 438, the compute device 106 checks a library for other fragments of the datagram. If the compute device 106 finds the last fragment (that is, the fragment with the flag for more fragments cleared) and every other fragment from the first to the last fragment without any gaps, then all fragments of the datagram have been received.

In block 440, if all fragments of the datagram have not been received, the method 400 proceeds to block 442, in which the compute device 106 stores the packet in the library for reassembly at a later time when the last packet is received. If the fragment is the first fragment in time received for a datagram, a timer may be started. If all of the fragments of the datagram have not been received by a particular time from when the first fragment is received, then all fragments of the datagram may be dropped. If all fragments of the datagram have been received, the method proceeds to block 444, in which the compute device 106 reassembles the datagram.

Referring now to FIG. 6, in block 446, in some embodiments, the compute device 106 determines whether a replay attack is detected. To do so, in the illustrative embodiment, the compute device 106 determines whether the received datagram (which may be from several reassembled packets or from one packet with a whole datagram) was received within the anti-replay window of the datagram with the highest sequence number for the security association of the datagram. The replay window may be any suitable value, such as 32-32,768.

In block 448, if the compute device 106 detects a replay attack, the method 400 jumps to block 464 in FIG. 7 to drop the packet. If the compute device 106 is not to drop the packet based on the classification, the method 400 proceeds to block 450.

In block 450, if the packet is encrypted, the compute device 106 decrypts the packet. In some embodiments, the packet may be decrypted in software, either in a core of the processor 202 or in the NIC 210. In other embodiments, the packet may be decrypted in hardware, such as in the NIC 210. The packet may be sent from a core of the processor 202 to the NIC 210 for hardware decryption in the NIC 210. In some embodiments, such as embodiments in which the packet contains a whole datagram and is not encrypted, the packet may be decrypted at an earlier time, such as before a replay attack is detected.

In block 458, the compute device 106 sends the packet to its destination. In some embodiments, the compute device 106 forwards the packet to a destination on the compute device 106. In other embodiments, the compute device 106 sends the packet back to the NIC 210 to be sent to a remote device, such as a device that is part of the mobile core network 108.

Referring now to FIG. 7, in block 464, the compute device 106 drops the packet that was received. In some cases, the compute device 106 drops the packet because the compute device 106 determined that the packet is malicious or potentially malicious. In some embodiments, the compute device 106 drops all other packets of the same datagram in block 468. In block 470, the compute device 106 logs that the packet was dropped, certain metadata about the packet such as header data, and the reason why the packet was dropped. The reason may be, e.g., that the packet did not pass a filter, that a packet was detected as an IP fragmentation attack, that the packet was detected as a replay attack, etc.

Figure 8:
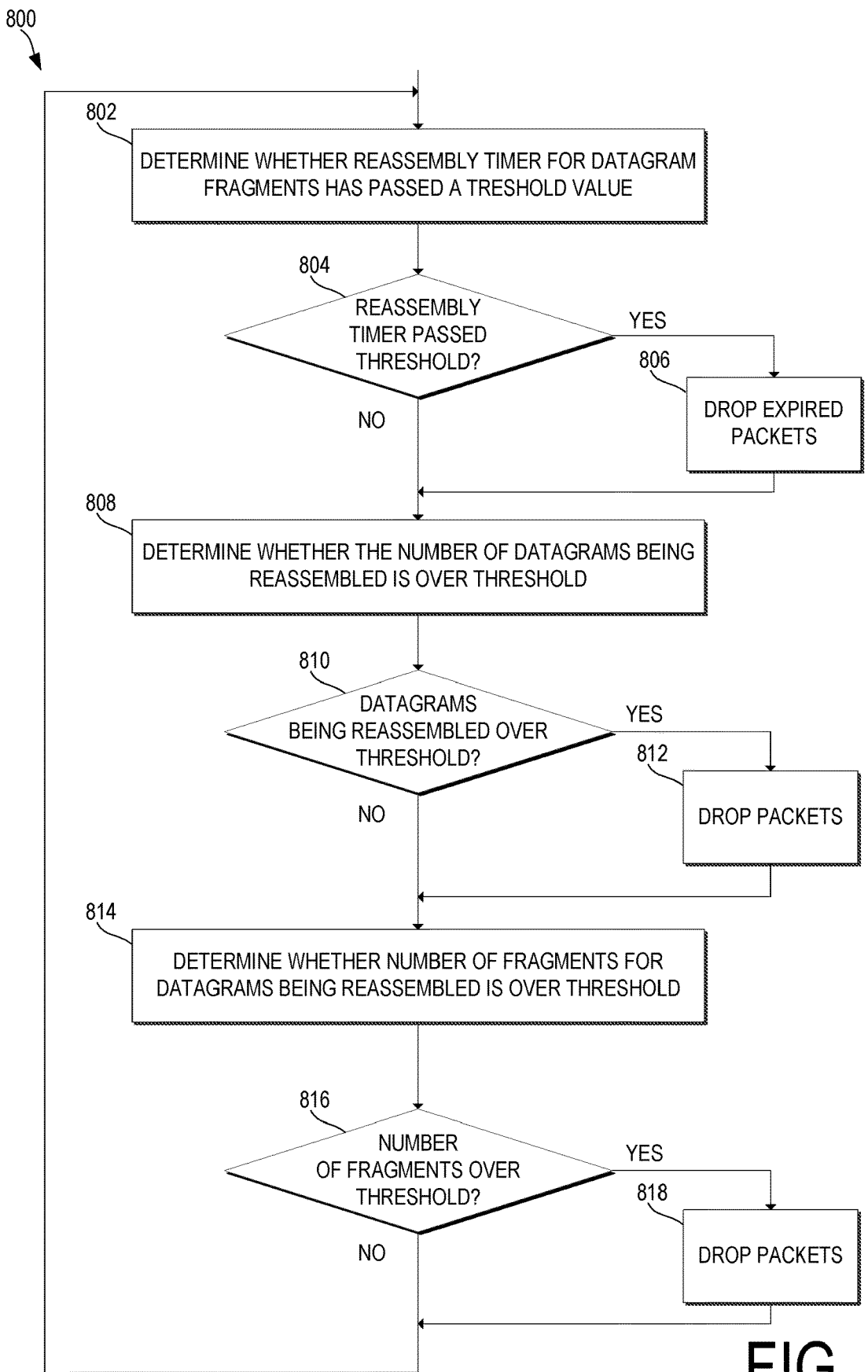
FIG. 8 is a simplified flow diagram of at least one embodiment of a method for checking for error conditions in the processing of packets that may be executed by the compute device of FIG. 1.

Referring now to FIG. 8, in use, the compute device 106 may execute a method 800 for checking for error conditions in the processing of packets. The method 800 may be executed by any suitable component or combination of components of the compute device 106, including hardware, software, firmware, etc. For example, some or all of the method 800 may be performed by the NIC 210 and/or the processor 202. It should be appreciated that the method 800 can be performed in parallel with the method 400. For example, a packet including a fragment of a datagram may be stored in a library for later reassembly as discussed above in regard to the method 400, and then the packet may be dropped if it times out as described below in regard to the method 800.

The method 800 begins in block 802, in which the compute device 106 determines whether the reassembly timer for the packets that include fragments of a datagram has passed a threshold value. In block 804, if the timer has passed a threshold value for any set of packets, the expired packets are dropped in block 806. A log entry may be made noting that the packets were dropped.

In block 808, the compute device 106 determines whether the number of datagrams being reassembled is over a threshold value. The threshold value may be any suitable value, such as $2^{10}$-$2^{32}$. In block 810, if the number of datagrams being reassembled is over a threshold, the method 800 proceeds to block 812, in which the compute device 106 drops some or all of the packets of datagrams to be reassembled. In some embodiments, the compute device 106 may select which packets to drop based on a class of service associated with the packets. Packets with a higher class of service may be kept, and packets with a lower class of service may be dropped. A log entry may be made noting that the packets were dropped.

In block 814, the compute device 106 determines whether the number of fragments for individual datagrams being reassembled is over a threshold. The threshold may be any suitable value, such as 4-1,024. In block 816, if the number of fragments is over the threshold for any datagram, the method 800 proceeds to block 818, in which the compute device 106 drops packets for datagrams that have too many fragments. A log entry may be made noting that the packets were dropped. The method 800 then loops back to block 802 to continue determining if a reassembly timer for datagram fragments has passed a threshold value.

Figure 9:
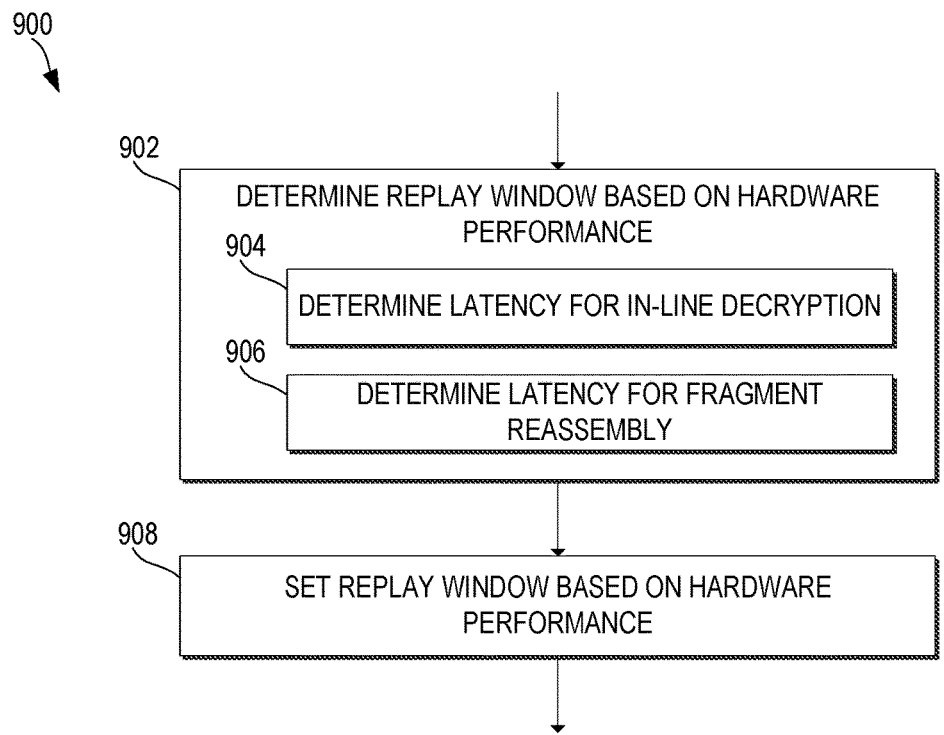
FIG. 9 is a simplified flow diagram of at least one embodiment of a method for determining a replay window of a replay attack detector that may be executed by the compute device of FIG. 1.

Referring now to FIG. 9, in use, the compute device 106 may execute a method 900 for determining a replay window of a replay attack detector. The method 900 may be executed by any suitable component or combination of components of the compute device 106, including hardware, software, firmware, etc. For example, some or all of the method 900 may be performed by the NIC 210 and/or the processor 202.

The method 900 begins in block 902, in which the compute device 106 determines a replay window for a replay attack detector based on hardware performance of the compute device 102. In block 904, the compute device 106 determines a latency for in-line decryption in the NIC 210 or other hardware or software decryption engine. In block 906, the compute device 106 determines a latency for fragment reassembly, that is, an expected latency for the time between receiving the first fragment of a datagram and when reassembly of the datagram is expected to be completed. In some embodiments, non-fragmented packets may be decrypted in-line, prior to a replay attack check, while fragmented packs may be reassembled and then checked for a replay attack, without decryption. As such, it should be appreciated that non-fragmented packets have a latency between receipt and the replay attack check than the latency for fragmented packets. The compute device 106 may determine a replay window based on these expected latencies to reduce or eliminate the chance of a datagram being rejected due to hardware latency before the replay attack check. The replay window may depend on the latency times, a processing speed, a network speed, an expected number of packets per second, etc.

In block 908, the compute device 106 sets the replay window based on the hardware performance. For example, the compute device 106 may set a parameter of one or more IPSec protocols.

EXAMPLES

Illustrative examples of the technologies disclosed herein are provided below. An embodiment of the technologies may include any one or more, and any combination of, the examples described below.

Example 1 includes a compute device comprising a network interface controller to receive a first plurality of packets; and receive a second plurality of packets; packet classifier circuitry to determine that individual packets of the first plurality of packets are fragments of a first datagram; determine that individual packets of the second plurality of packets are fragments of a second datagram; determine a first class of service for the first plurality of packets; and determine a second class of service for the second plurality of packets; and packet reassembler circuitry to determine whether the first class of service is higher than the second class of service; and reassemble, based on the first plurality of packets and in response to a determination that the first class of service is higher than the second class of service, the first datagram before reassembly of the second datagram.

Example 2 includes the subject matter of Example 1, and wherein to determine the first class of service for the first plurality of packets comprises to determine the first class of service for the first plurality of packets based on one or more of, a source IP address, a source port number, a destination IP address, a destination port number, and a protocol in use of at least one packet of the plurality of first packets.

Example 3 includes the subject matter of any of Examples 1 and 2, and wherein the packet classifier circuitry is further to send, prior to reassembly of the first datagram, at least one packet of the first plurality of packets to a reorderless ring.

Example 4 includes the subject matter of any of Examples 1-3, and wherein the reorderless ring is associated with the first class of service, wherein to send the at least one packet to the reorderless ring comprises to send the at least one packet to the reorderless ring based on the at least one packet having the first class of service.

Example 5 includes the subject matter of any of Examples 1-4, and wherein to determine the first class of service for the first plurality of packets comprises to determine, by a network accelerator complex of the compute device, the first class of service for the first plurality of packets.

Example 6 includes the subject matter of any of Examples 1-5, and wherein to reassemble the first datagram comprises to reassemble the first datagram on a core of a processor of the compute device.

Example 7 includes the subject matter of any of Examples 1-6, and further including replay attack detector circuitry to determine a replay window at least partially based on a hardware parameter of the compute device.

Example 8 includes the subject matter of any of Examples 1-7, and wherein to determine the replay window comprises to determine the replay window at least partially based on a latency of an encryption engine of the network interface controller.

Example 9 includes the subject matter of any of Examples 1-8, and wherein to determine the replay window comprises to determine the replay window at least partially based on a latency of datagram reassembly of the compute device.

Example 10 includes the subject matter of any of Examples 1-9, and wherein the first datagram is an Internet Protocol (IP) datagram.

Example 11 includes a method comprising receiving, by a compute device, a first plurality of packets; receiving, by the compute device, a second plurality of packets; determining, by the compute device, that individual packets of the first plurality of packets are fragments of a first datagram; determining, by the compute device, that individual packets of the second plurality of packets are fragments of a second datagram; determining, by the compute device, a first class of service for the first plurality of packets; and determining, by the compute device, a second class of service for the second plurality of packets; determining, by the compute device, whether the first class of service is higher than the second class of service; and reassembling, based on the first plurality of packets and in response to a determination that the first class of service is higher than the second class of service, the first datagram before reassembly of the second datagram.

Example 12 includes the subject matter of Example 11, and wherein determining the first class of service for the first plurality of packets comprises determining the first class of service for the first plurality of packets based on one or more of, a source IP address, a source port number, a destination IP address, a destination port number, and a protocol in use of at least one packet of the plurality of first packets.

Example 13 includes the subject matter of any of Examples 11 and 12, and further including sending, by the compute device and prior to reassembly of the first datagram, at least one packet of the first plurality of packets to a reorderless ring.

Example 14 includes the subject matter of any of Examples 11-13, and wherein the reorderless ring is associated with the first class of service, wherein sending the at least one packet to the reorderless ring comprises sending the at least one packet to the reorderless ring based on the at least one packet having the first class of service.

Example 15 includes the subject matter of any of Examples 11-14, and wherein determining, by the compute device, the first class of service for the first plurality of packets comprises determining, by a network accelerator complex of the compute device, the first class of service for the first plurality of packets.

Example 16 includes the subject matter of any of Examples 11-15, and wherein reassembling the first datagram comprises reassembling the first datagram on a core of a processor of the compute device.

Example 17 includes the subject matter of any of Examples 11-16, and further including determining, by the compute device, a replay window at least partially based on a hardware parameter of the compute device.

Example 18 includes the subject matter of any of Examples 11-17, and wherein determining the replay window comprises determining the replay window at least partially based on a latency of an encryption engine of a network interface controller.

Example 19 includes the subject matter of any of Examples 11-18, and wherein determining the replay window comprises determining the replay window at least partially based on a latency of datagram reassembly of the compute device.

Example 20 includes the subject matter of any of Examples 11-19, and wherein the first datagram is an Internet Protocol (IP) datagram.

Example 21 includes one or more computer-readable media comprising a plurality of instructions stored thereon that, when executed, causes a compute device to receive a first plurality of packets; receive a second plurality of packets; determine that individual packets of the first plurality of packets are fragments of a first datagram; determine that individual packets of the second plurality of packets are fragments of a second datagram; determine a first class of service for the first plurality of packets; determine a second class of service for the second plurality of packets; determine whether the first class of service is higher than the second class of service; and reassemble, based on the first plurality of packets and in response to a determination that the first class of service is higher than the second class of service, the first datagram before reassembly of the second datagram.

Example 22 includes the subject matter of Example 21, and wherein to determine the first class of service for the first plurality of packets comprises to determine the first class of service for the first plurality of packets based on one or more of, a source IP address, a source port number, a destination IP address, a destination port number, and a protocol in use of at least one packet of the plurality of first packets.

Example 23 includes the subject matter of any of Examples 21 and 22, and wherein the plurality of instructions further cause the compute device to send, prior to reassembly of the first datagram, at least one packet of the first plurality of packets to a reorderless ring.

Example 24 includes the subject matter of any of Examples 21-23, and wherein the reorderless ring is associated with the first class of service, wherein to send the at least one packet to the reorderless ring comprises to send the at least one packet to the reorderless ring based on the at least one packet having the first class of service.

Example 25 includes the subject matter of any of Examples 21-24, and wherein to determine the first class of service for the first plurality of packets comprises to determine, by a network accelerator complex of the compute device, the first class of service for the first plurality of packets.

Example 26 includes the subject matter of any of Examples 21-25, and wherein to reassemble the first datagram comprises to reassemble the first datagram on a core of a processor of the compute device.

Example 27 includes the subject matter of any of Examples 21-26, and wherein the plurality of instructions further cause the compute device to determine a replay window at least partially based on a hardware parameter of the compute device.

Example 28 includes the subject matter of any of Examples 21-27, and wherein to determine the replay window comprises to determine the replay window at least partially based on a latency of an encryption engine of a network interface controller.

Example 29 includes the subject matter of any of Examples 21-28, and wherein to determine the replay window comprises to determine the replay window at least partially based on a latency of datagram reassembly of the compute device.

Example 30 includes the subject matter of any of Examples 21-29, and wherein the first datagram is an Internet Protocol (IP) datagram.

Example 31 includes a compute device comprising means for receiving a first plurality of packets; means for receiving a second plurality of packets; means for determining that individual packets of the first plurality of packets are fragments of a first datagram; means for determining that individual packets of the second plurality of packets are fragments of a second datagram; means for determining a first class of service for the first plurality of packets; and means for determining a second class of service for the second plurality of packets; means for determining whether the first class of service is higher than the second class of service; and means for reassembling, based on the first plurality of packets and in response to a determination that the first class of service is higher than the second class of service, the first datagram before reassembly of the second datagram.

Example 32 includes the subject matter of Example 31, and wherein the means for determining the first class of service for the first plurality of packets comprises means for determining the first class of service for the first plurality of packets based on one or more of, a source IP address, a source port number, a destination IP address, a destination port number, and a protocol in use of at least one packet of the plurality of first packets.

Example 33 includes the subject matter of any of Examples 31 and 32, and further including means for sending, prior to reassembly of the first datagram, at least one packet of the first plurality of packets to a reorderless ring.

Example 34 includes the subject matter of any of Examples 31-33, and wherein the reorderless ring is associated with the first class of service, wherein the means for sending the at least one packet to the reorderless ring comprises means for sending the at least one packet to the reorderless ring based on the at least one packet having the first class of service.

Example 35 includes the subject matter of any of Examples 31-34, and wherein the means for determining the first class of service for the first plurality of packets comprises means for determining, by a network accelerator complex of the compute device, the first class of service for the first plurality of packets.

Example 36 includes the subject matter of any of Examples 31-35, and wherein the means for reassembling the first datagram comprises means for reassembling the first datagram on a core of a processor of the compute device.

Example 37 includes the subject matter of any of Examples 31-36, and further including means for determining a replay window at least partially based on a hardware parameter of the compute device.

Example 38 includes the subject matter of any of Examples 31-37, and wherein the means for determining the replay window comprises means for determining the replay window at least partially based on a latency of an encryption engine of a network interface controller.

Example 39 includes the subject matter of any of Examples 31-38, and wherein the means for determining the replay window comprises means for determining the replay window at least partially based on a latency of datagram reassembly of the compute device.

Example 40 includes the subject matter of any of Examples 31-39, and wherein the first datagram is an Internet Protocol (IP) datagram.

The invention claimed is:

1. A compute device comprising:
   a network interface controller to:
      receive a first plurality of packets; and
      receive a second plurality of packets;
   packet classifier circuitry to:
      determine that individual packets of the first plurality of packets are fragments of a first datagram;
      determine that individual packets of the second plurality of packets are fragments of a second datagram;
      determine a first class of service for the first plurality of packets; and
      determine a second class of service for the second plurality of packets; and
   packet reassembler circuitry to:
      determine whether the first class of service is higher than the second class of service; and
      reassemble, based on the first plurality of packets and in response to a determination that the first class of service is higher than the second class of service, the first datagram before reassembly of the second datagram.

2. The compute device of claim 1, wherein to determine the first class of service for the first plurality of packets comprises to determine the first class of service for the first plurality of packets based on one or more of, a source IP address, a source port number, a destination IP address, a destination port number, and a protocol in use of at least one packet of the first plurality of packets.

3. The compute device of claim 1, wherein the packet classifier circuitry is further to send, prior to reassembly of the first datagram, at least one packet of the first plurality of packets to a reorderless ring.

4. The compute device of claim 3, wherein the reorderless ring is associated with the first class of service, wherein to send the at least one packet to the reorderless ring comprises to send the at least one packet to the reorderless ring based on the at least one packet having the first class of service.

5. The compute device of claim 1, wherein to determine the first class of service for the first plurality of packets comprises to determine, by a network accelerator complex of the compute device, the first class of service for the first plurality of packets.

6. The compute device of claim 5, wherein to reassemble the first datagram comprises to reassemble the first datagram on a core of a processor of the compute device.

7. The compute device of claim 1, further comprising replay attack detector circuitry to determine a replay window at least partially based on a hardware parameter of the compute device.

8. The compute device of claim 7, wherein to determine the replay window comprises to determine the replay window at least partially based on a latency of an encryption engine of the network interface controller.

9. The compute device of claim 7, wherein to determine the replay window comprises to determine the replay window at least partially based on a latency of datagram reassembly of the compute device.

10. The compute device of claim 1, wherein the first datagram is an Internet Protocol (IP) datagram.

11. A method comprising:
receiving, by a compute device, a first plurality of packets;
receiving, by the compute device, a second plurality of packets;
determining, by the compute device, that individual packets of the first plurality of packets are fragments of a first datagram;
determining, by the compute device, that individual packets of the second plurality of packets are fragments of a second datagram;
determining, by the compute device, a first class of service for the first plurality of packets;
determining, by the compute device, a second class of service for the second plurality of packets;
determining, by the compute device, whether the first class of service is higher than the second class of service; and
reassembling, based on the first plurality of packets and in response to a determination that the first class of service is higher than the second class of service, the first datagram before reassembly of the second datagram.

12. The method of claim 11, wherein determining the first class of service for the first plurality of packets comprises determining the first class of service for the first plurality of packets based on one or more of, a source IP address, a source port number, a destination IP address, a destination port number, and a protocol in use of at least one packet of the first plurality of packets.

13. The method of claim 11, wherein determining, by the compute device, the first class of service for the first plurality of packets comprises determining, by a network accelerator complex of the compute device, the first class of service for the first plurality of packets.

14. The method of claim 11, further comprising determining, by the compute device, a replay window at least partially based on a hardware parameter of the compute device.

15. The method of claim 14, wherein determining the replay window comprises determining the replay window at least partially based on a latency of an encryption engine of a network interface controller.

16. The method of claim 14, wherein determining the replay window comprises determining the replay window at least partially based on a latency of datagram reassembly of the compute device.

17. One or more non-transitory computer-readable media comprising a plurality of instructions stored thereon that, when executed, causes a compute device to:
receive a first plurality of packets;
receive a second plurality of packets;
determine that individual packets of the first plurality of packets are fragments of a first datagram;
determine that individual packets of the second plurality of packets are fragments of a second datagram;
determine a first class of service for the first plurality of packets;
determine a second class of service for the second plurality of packets;
determine whether the first class of service is higher than the second class of service; and
reassemble, based on the first plurality of packets and in response to a determination that the first class of service is higher than the second class of service, the first datagram before reassembly of the second datagram.

18. The one or more non-transitory computer-readable media of claim 17, wherein to determine the first class of service for the first plurality of packets comprises to determine the first class of service for the first plurality of packets based on one or more of, a source IP address, a source port number, a destination IP address, a destination port number, and a protocol in use of at least one packet of the first plurality of packets.

19. The one or more non-transitory computer-readable media of claim 17, wherein the plurality of instructions further cause the compute device to send, prior to reassembly of the first datagram, at least one packet of the first plurality of packets to a reorderless ring.

20. The one or more non-transitory computer-readable media of claim 19, wherein the reorderless ring is associated with the first class of service, wherein to send the at least one packet to the reorderless ring comprises to send the at least one packet to the reorderless ring based on the at least one packet having the first class of service.

21. The one or more non-transitory computer-readable media of claim 17, wherein to determine the first class of service for the first plurality of packets comprises to determine, by a network accelerator complex of the compute device, the first class of service for the first plurality of packets.

22. The one or more non-transitory computer-readable media of claim 21, wherein to reassemble the first datagram comprises to reassemble the first datagram on a core of a processor of the compute device.

23. The one or more non-transitory computer-readable media of claim 17, wherein the plurality of instructions further cause the compute device to determine a replay window at least partially based on a hardware parameter of the compute device.

24. The one or more non-transitory computer-readable media of claim 23, wherein to determine the replay window comprises to determine the replay window at least partially based on a latency of an encryption engine of a network interface controller.

25. The one or more non-transitory computer-readable media of claim 23, wherein to determine the replay window comprises to determine the replay window at least partially based on a latency of datagram reassembly of the compute device.

* * * * *